United States Patent
Horng

(10) Patent No.: US 6,250,809 B1
(45) Date of Patent: Jun. 26, 2001

(54) BEARING STRUCTURES FOR A MOTOR ROTOR

(75) Inventor: Alex Horng, Kaohsiung (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 0 days.

(21) Appl. No.: 09/472,787

(22) Filed: Dec. 28, 1999

(51) Int. Cl.$^7$ ..................................................... F16C 23/04
(52) U.S. Cl. .............................................. 384/322; 384/192
(58) Field of Search ..................................... 384/322, 397, 384/380, 381, 192, 202, 213, 215, 275, 276, 286, 295, 296

(56) References Cited

U.S. PATENT DOCUMENTS 5,885,006 * 3/1999 Sheedy ................................. 384/192
5,938,345 * 8/1999 Wu ....................................... 384/322

* cited by examiner

Primary Examiner—Dirk Wright
(74) Attorney, Agent, or Firm—Bacon & Thomas, PLLC

(57) ABSTRACT

A bearing structure for a motor rotor includes an engaging portion of a larger diameter formel on an outer periphery of the bearing tightly mounted to an inner periphery of an axle tube. The bearing structure further includes an axle hole for pivotally supporting a shaft of the motor rotor. The axle hole includes a pivotal section and an oil reservoir section that has an inner diameter larger than that of the pivotal section and that is not aligned with the pivotal section.

7 Claims, 3 Drawing Sheets

BEARING STRUCTURES FOR A MOTOR ROTOR

BACKGROUND OF THE INVENTION

1. Field of the Invention

The present invention relates to bearing structures for a motor rotor, wherein a bearing structure with an axle hole is pressed into and tightly fitted with an axle tube without causing deformation on an inner periphery of the axle hole. A shaft of the rotor pivotally supported in the axle hole of the bearing may rotate smoothly without deviation.

2. Description of the Related Art

FIGS. 1 and 2 of the drawings illustrate a conventional motor rotor having a Shaft 91, a bearing 92, and an axle tube 93. The bearing 92 is generally an oil-pregnant copper bearing or non-ball type bearing. The bearing 92 is pressed into an interior of the axle tube 93 so as to be tightly engaged to an inner periphery of the axle tube 93. The inner peripheral radial deformation occurs during forced fitting of the bearing 92. Adverse affection to rotation of the Shaft 91 of the rotor occurs even though the deformation is very minor. As a result, rotational noise is generated and the motor operating life is shortened. More specifically, the length of the inner periphery of the bearing 92 is approximately the same as that of the outer periphery of the bearing 92 such that when the bearing is forced fitting into the axle tube 93, the inner periphery 94 of the axle hole of the bearing 92 resulted in irregular deformation. As a result, smooth surface of the shaft 91 becomes in contact with deformed inner periphery 94 of the axle hole of the bearing 92. Accordingly, noise is generated during rotation of the shaft 91 and the motor operating life is shortened.

SUMMARY OF THE INVENTION

It is a primary object of the present invention to provide a bearing structure that solves the above-mentioned problems. This object is achieved by means of reducing deformation of the bearing in the axle tube and avoiding deformation in the contact area between the Shaft of the rotor and an inner periphery of the axle hole of the bearing, thereby providing smooth rotation for the Shaft.

It is a secondary object of the present invention to provide a bearing structure for a motor rotor that has an axle hole with an reservoir section for lubrication oil.

A bearing structure in accordance with the present invention includes an outer periphery with an engaging portion fittingly mounted to an inner periphery of an axle tube. The bearing structure further includes an axle hole with a pivotal section for pivotally supporting a Shaft of the motor rotor. The pivotal section is not aligned with the engaging portion. Thus, when the bearing is mounted into the axle tube, only minor deformation is caused in the inner periphery of the axle hole of the bearing corresponding to the engaging portion, and no deformation is caused in the contact area between the Shaft and the inner periphery of the axle hole of the bearing, thereby providing smooth rotation for the Shaft of the rotor.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Figure 1:
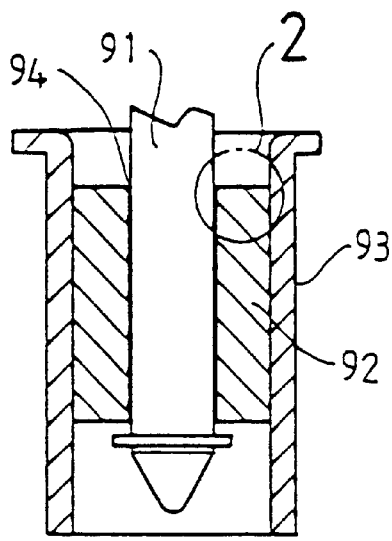
FIG. 1 is a sectional view of a conventional bearing structure for a motor rotor.
Figure 2:
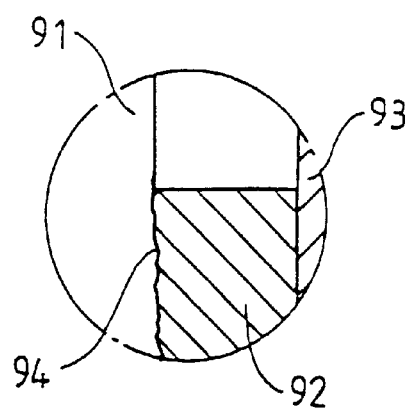
FIG. 2 is an enlarged view of a circle in FIG. 1.
Figure 3:
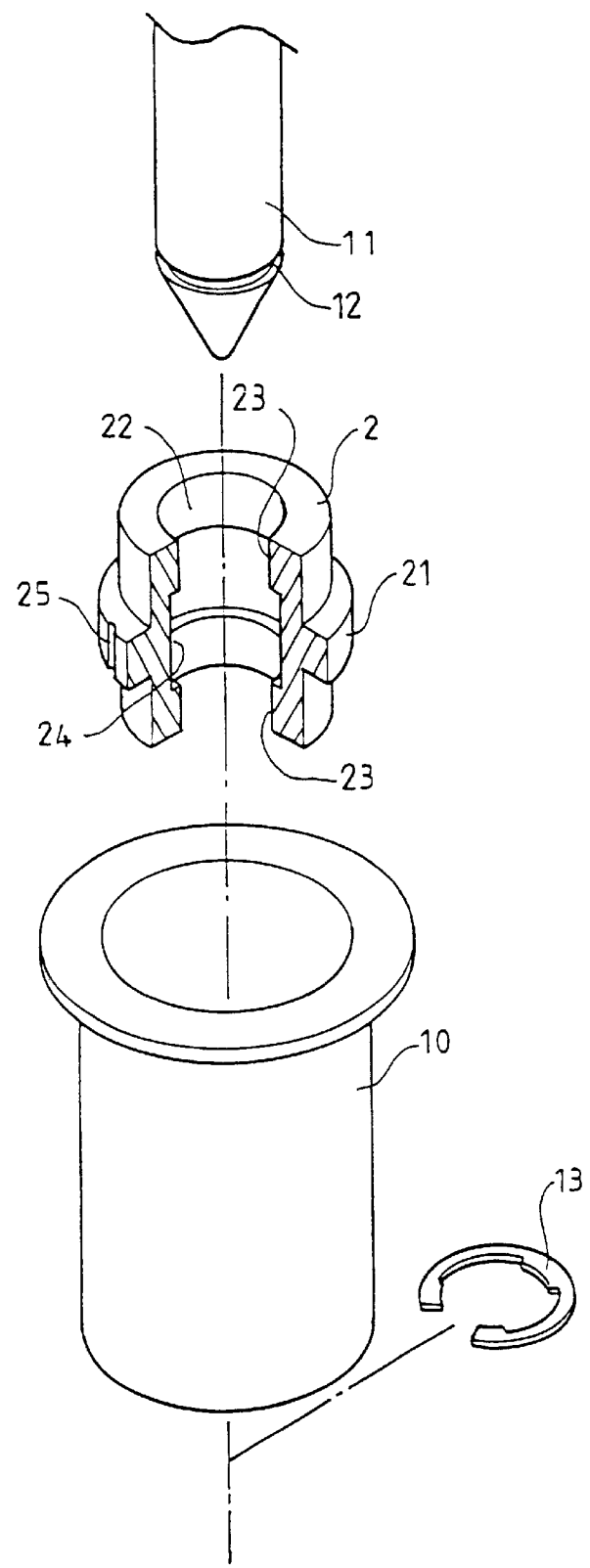
FIG. 3 is an exploded perspective view, partly cutaway, of a first embodiment of a bearing structure for a motor rotor in accordance with the present invention.

The present invention will be described below with reference to FIGS. 3 through 6. Referring to FIG. 3, a first embodiment of a bearing structure 2 for a motor rotor in accordance with the present invention includes an engaging portion 21 formed on an outer periphery thereof and tightly fitted onto an inner periphery of an axle tube 10. The bearing 2 includes an axle hole 22 with a pivotal section 23 formed on an inner periphery for pivotally supporting a shaft 11 of a rotor. The shaft 11 includes an annular groove 12 for receiving a retainer 13 (e.g., a C-clip) that retains the shaft 11 in place.

The bearing 2 may be an oil-pregnant bearing, copper bearing, or a non-ball type bearing. As mentioned above, the bearing 2 includes an engaging portion 21 of a larger diameter formed on an outer periphery thereof and pressed into and tightly fitted onto the inner periphery of the axle tube 10. Thus, the bearing 2 is securely held in the inner periphery of the axle tube 10. The engaging portion 21 of the bearing 2 may include at least one longitudinally extending groove 25 to form a circulation path for the lubrication oil.

The inner periphery of the axle hole 22 of the bearing 2 includes two pivotal sections 23 for pivotally holding the shaft 11 and an oil reservoir section 24 between the pivotal sections 23 for storage of lubrication oil. The oil reservoir section 24 has a diameter larger than that of the pivotal sections 23. In addition, the engaging portion 21 is arranged to not align with the pivotal sections 23 yet align with the oil reservoir section 24.

Figure 4:
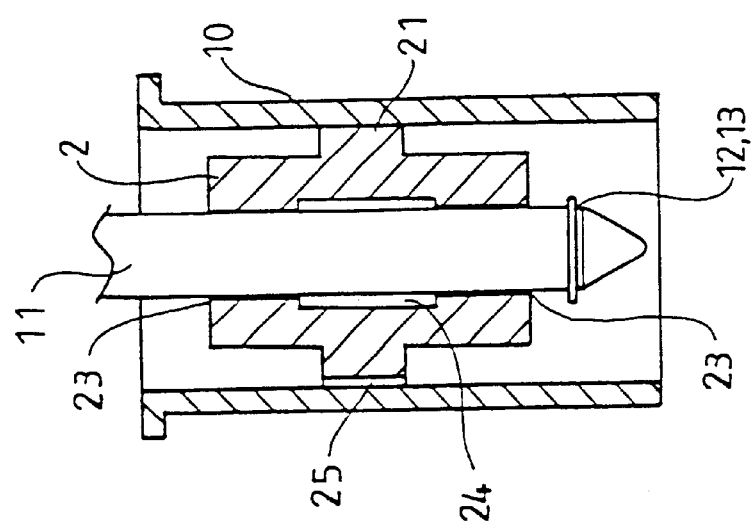
FIG. 4 is a sectional view of the bearing structure for a motor rotor in FIG. 3.

As illustrated in FIG. 4, the engaging portion 21 of the bearing 2 is tightly secured to the inner periphery of the axle tube 10. The pivotal sections 23 of the axle hole 22 of the bearing 2 provide rotational support for the shaft 11. Since the pivotal sections 23 are not aligned with the engaging portion 21, the compressed engaging portion 21 only causes deformation of the inner periphery of the axle hole 22 of the bearing 2 in the oil reservoir section 24 when the bearing 2 is tightly-fitted onto the inner periphery of the axle tube 10. As a result, deformed portion of the axle hole 22 of the bearing 2 is not in contact with the shaft 11 such that the shaft 11 may rotate smoothly in the pivotal sections 23 of the bearing 2. In addition, since the oil reservoir section 24 has a diameter larger than that of the pivotal sections 23, the oil reservoir section 24 provides a space for storage of lubrication oil as well as impurities in the lubrication oil, thereby allowing smooth rotation of the shaft 11.

Figure 5:
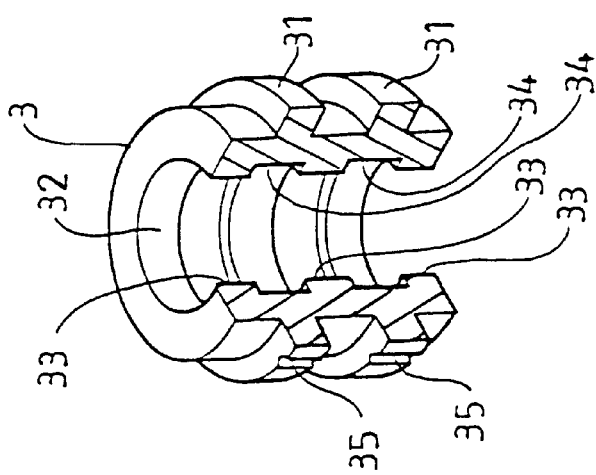
FIG. 5 is a perspective view, partly cutaway, illustrating a second embodiment of the bearing structure in accordance with the present invention.

FIG. 5 illustrates a perspective view of a second embodiment of the bearing structure for a motor rotor. In this embodiment, the bearing 3 has three pivotal sections 33 and two annular oil reservoir sections 34. The bearing 3 further has two engaging portions 31 on an outer periphery thereof.

Each engaging portion 31 includes a longitudinally extending groove 35 o form a flow path for the lubrication oil.

The pivotal sections 33 formed on the inner periphery of the axle hole 32 of the bearing 3 are not aligned with the engaging portions 31. Yet, the engaging portions 31 are aligned with the oil reservoir sections 34, respectively.

Figure 6:
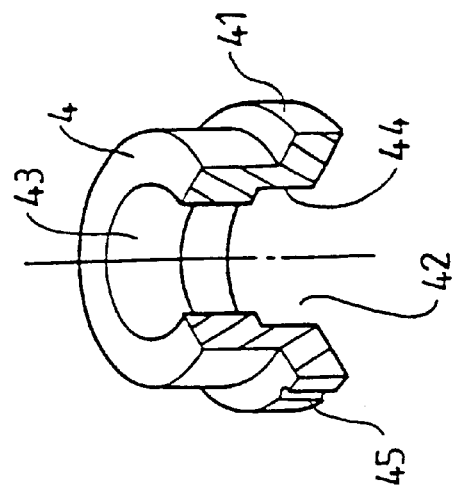
FIG. 6 is a perspective view, partly cutaway, illustrating a third embodiment of the bearing structure in accordance with the present invention.

FIG. 6 illustrates a perspective view of a third embodiment of the bearing structure for a motor rotor. In this embodiment, the bearing 4 has an engaging portion 41 with a larger diameter formed on an outer periphery thereof so as to be tightly secured to the inner periphery of the axle tube 10. The engaging portion 41 on each bearing 4 includes a longitudinally extending groove 45 to provide a flow path for the lubrication oil.

The inner periphery of the axle bole 42 of the bearing 4 includes a pivotal section 43 and an oil reservoir section 44 having a diameter larger than that of the pivotal section 43. The pivotal section 43 is not aligned with the engaging portion 41. Yet, the engaging portion 41 at outer periphery is aligned with the oil reservoir sections 44 at inner periphery.

According to the above description, it is appreciated that the bearing is tightly secured to the inner periphery of the axle tube by means of the engaging portion(s) such that only minor deformation occurs along the longitudinal length of the axle hole of the bearing at the area other than the pivotal section(s). The pivotal sections of the bearing have no deformation. Accordingly, deviation of the shaft pivotally held in the axle hole of the bearing is avoided. Noise and abnormal friction are both reduced during rotation, thereby allowing smoother rotation of the Shaft. In addition, provision of the oil reservoir section(s) may further reduce friction of the rotating shaft and enhance smooth rotation, thereby increasing the operating life of the bearing and the rotor.

Although the invention has been explained in relation to its preferred embodiment as mentioned above, it is to be understood that many other possible modifications and variations can be made without departing from the spirit and scope of the invention. It is, therefore, contemplated that the appended claims will cover such modifications and variations that fall within the true scope of the invention.

What is claimed is:

1. A bearing structure for a motor rotor, comprising a bearing with at least one engaging portion of a relatively larger diameter formed on an outer periphery thereof, the bearing further including an axle hole with an inner periphery having at least one pivotal section adapted to pivotally support a Shaft of the motor rotor, the inner periphery defining the axle hole further including at least one oil reservoir section having a diameter greater than that of said at least one pivotal section, said at least one pivotal section being not aligned with said at least one engaging portion.

2. The bearing structure as claimed in claim 1, wherein said at least one engaging portion formed on the outer periphery of the bearing is aligned with said at least one oil reservoir section.

3. The bearing structure as claimed in claim 1, wherein the inner periphery defining the axle hole of the bearing includes two said pivotal sections respectively formed on two ends of the axle hole and one said oil reservoir section formed between the pivotal sections.

4. The bearing structure as claimed in claim 1, wherein the outer periphery of the bearing includes two spaced said engaging portions formed thereon, and wherein the inner periphery defining the axle hole of the bearing includes three said pivotal sections, each two adjacent said pivotal section having one said oil reservoir section therebetween.

5. The bearing structure as claimed in claim 1, wherein said at least one engaging portion includes at least one longitudinally extending groove.

6. A bearing supporting structure for a motor rotor, comprising:

an axle tube having an inner periphery;

a Shaft; and a bearing including an engaging portion of a relatively larger diameter formed on an outer periphery thereof and tightly engaged to the inner periphery of the axle tube, the bearing further including an axle hole with an inner periphery having a pivotal section for pivotally supporting the shaft of the motor rotor, the inner periphery defining the axle hole further having an oil reservoir section having a diameter larger than that of said pivotal section, said pivotal section being not aligned with the engaging portion.

7. The bearing structure as claimed in claim 1, wherein said at least one engaging portion includes at least one longitudinally extending groove.

* * * * *